Figure 1:
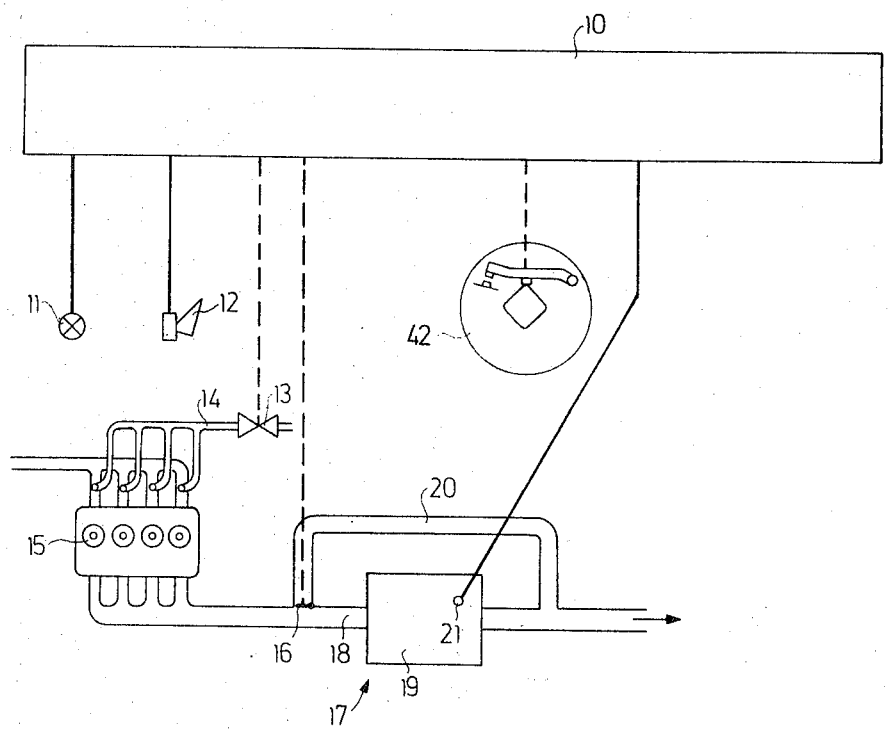

United States Patent [19]
Eichler et al.

[11] 3,851,469
[45] Dec. 3, 1974

[54] TEMPERATURE SUPERVISORY SYSTEM FOR EXHAUST GAS REACTORS FOR INTERNAL COMBUSTION ENGINES

[75] Inventors: Dieter Eichler, Hochberg; Walter Remmele, Stuttgart, both of Germany

[73] Assignee: Robert Bosch GmbH, Gerlingen-Schillerhoehe, Germany

[22] Filed: Aug. 23, 1972

[21] Appl. No.: 283,177

[30] Foreign Application Priority Data
Jan. 29, 1972  Germany............................ 2204286

[52] U.S. Cl................... 60/277, 60/288, 60/285, 123/198 DB, 123/32 EA, 123/117 R, 340/228 R, 340/417
[51] Int. Cl............................................. F02b 75/10
[58] Field of Search............. 60/277, 288, 276, 285; 123/198 D, 198 DB, 117 R, 32 EA; 340/52 R, 52 F, 57, 227 R, 228 R, 417

[56] References Cited
UNITED STATES PATENTS

| | | | |
|---|---|---|---|
| 3,131,314 | 4/1964 | Charlot | 307/88.5 |
| 3,202,161 | 8/1965 | Richards | 123/198 D |
| 3,273,971 | 9/1966 | Baddorf | 60/288 |
| 3,301,245 | 1/1967 | Woodburn | 123/198 D |
| 3,338,682 | 8/1967 | Fowler | 60/288 |
| 3,566,846 | 3/1971 | Glockler | 123/32 EA |
| 3,581,490 | 6/1971 | Morris | 60/288 |
| 3,582,926 | 6/1971 | Hassan | 340/228 R |
| 3,602,207 | 8/1971 | Kilmer | 123/198 D |
| 3,671,953 | 6/1972 | Goldberg | 340/227 R |
| 3,680,318 | 8/1972 | Nakajima | 60/288 |
| 3,693,603 | 9/1972 | Lemanczyk | 123/32 EA |
| 3,696,618 | 10/1972 | Boyd | 60/285 |
| 3,738,108 | 6/1973 | Goto | 60/277 |

*Primary Examiner*—Douglas Hart
*Attorney, Agent, or Firm*—Flynn & Frishauf

[57] ABSTRACT

A temperature sensor is located in thermal sensing relationship to a component of the engine system, for example, a catalytic or thermal reactor in the exhaust system to reduce noxious components of the exhaust gases, the sensor providing an electrical output signal representative of temperature. A threshold switch, having at least one switching threshold, is responsive to the electrical output signal when a temperature threshold has been exceeded, to provide an alarm signal or bypass exhaust gases past the reactor to prevent damage to the reactor due to excessive temperatures. The threshold switch preferably includes operational amplifiers.

14 Claims, 2 Drawing Figures

TEMPERATURE SUPERVISORY SYSTEM FOR EXHAUST GAS REACTORS FOR INTERNAL COMBUSTION ENGINES

CROSS REFERENCE TO RELATED PATENT AND APPLICATIONS U.S. Pat. No. 3,483,851, Reichardt, Dec. 16, 1969. U.S. Pat. No. 3,745,768, Zechnall et al. Ser. No. 259,157, filed June 2, 1972, Schmidt et al. U.S. Pat. No. 3,759,232, Wahl et al. Ser. No. 259,134, filed June 2, 1972, Topp et al. U.S. Pat. No. 3,782,347, Schmidt et al. U.S. Pat. No. 3,815,560, Wahl et al. U.S. Pat. No. 3,827,237, Linder et al. Ser. No. 267,562, filed May 6, 1972, Eichler et al. Ser. No. 282,848, filed Aug. 22, 1972, Eichler et al., continuation filed under Ser. No. 453,015, U.S. Pat. No. 3,832,848, Scholl.

The present invention relates to supervisory apparatus for reactors and especially catalytic thermal reactors in the exhaust system of internal combustion engines and, more particularly, in automotive-type internal combustion engines.

Thermal and catalytic reactors, or either thermal or catalytic reactors are used in the exhaust system of internal combustion engines to reduce noxious components in the exhaust gases, particularly carbon monoxide, unburned hydrocarbons, and nitrogen oxygen compounds ($NO_x$). These reactors, and particularly catalytic reactors are comparatively expensive and their operation should therefore be monitored in order to prevent damage to the reactors due to excessive operating conditions, and to provide for effective operation thereof so that the exhaust gases passing therethrough are truly cleaned to reduce the noxious component emitted from the exhaust system of the engine.

It is an object of the present invention to provide a monitoring or supervisory apparatus for reactors in the exhaust system of internal combustion engines, to give an indication upon improper operation and, preferably, to also automatically take corrective action.

SUBJECT MATTER OF THE PRESENT INVENTION

Briefly, a temperature sensing device is located in thermal conductive relationship to the exhaust system of the engine, typically in heat transfer relation to the reactor itself which provides an output signal, which, when a certain threshold is exceeded, furnishes a control signal, for example to operate an alarm. In accordance with a feature of the invention, the control signal can be applied to an indicator to warn the operator of the engine and/or cause or command remedial action to be taken automatically, for example, by bypassing exhaust gases from the engine passed the reactor to reduce the temperature thereof, or, for example, to throttle or completely interrupt fuel supply to the engine to prevent additional and hot exhaust gases from passing through the engine and thus further heating and damaging to the reactor.

Figure 2:
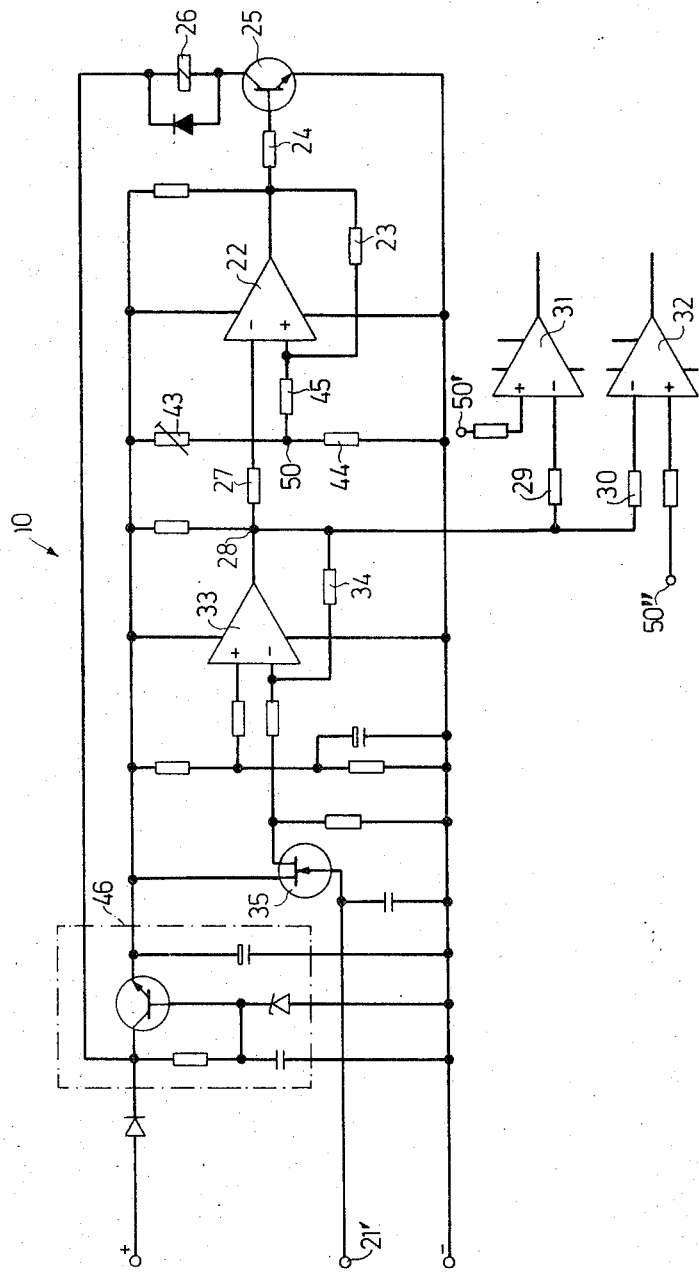

The invention will be described by way of example with reference to the accompanying drawings, wherein:

FIG. 1 is a schematic representation of the engine system with a temperature switch, and illustrating the apparatus in an engine system; and FIG. 2 is a highly schematic circuit diagram of an electronic temperature threshold switch particularly adapted to be powered by electrical supply derived from an automotive vehicle battery.

A temperature sensitive switch 10 is schematically indicated in FIG. 1, switch 10 having several temperature threshold levels. These temperature threshold levels are associated with various specific temperatures arising in the exhaust system of the internal combustion engine. The temperature sensitive switch provides output signals to operate optical or acoustical warning devices, such as a lamp 11 or an audible indicator 12. Additionally, temperature sensitive switch 10 provides an output signal to control a valve 13 connected to the fuel supply line 14 of internal combustion engine 15. Valve 13 is arranged to throttle, or completely interrupt or completely open fuel supply to the internal combustion engine 15. Temperature sensitive switch 10 provides an additional output signal which controls a flap valve 16 located in the exhaust pipe 18 of exhaust system 17 in order to divert exhaust gases from a catalytic reactor 19 and, instead, pass the exhaust gases through a bypass 20, for further communication to the tail pipe of the engine. Flap valve 16 thus controls the path of the exhaust gases either through reactor 19 or through bypass 20.

A temperature sensing element 21 is located in heat transfer relation to the reactor 19. The system supervises and monitors temperatures arising within the exhaust system 17 of the engine, and more particularly within the catalytic reactor 19. The temperature sensor 21 is connected to switch 10. When the operating temperature of the reactor 19 is at normal level, none of the devices 11, 12, 13 or 16 are being operated, and switch 10 is in its quiescent condition. If the temperature of sensor 21 is below a certain level, indicating that the catalytic reactor has not yet reached its normal operating temperature, then switch 10 can be utilized to control a delay of the ignition timing, as schematically indicated at 42. (See cross referenced application Ser. No. 267,254; filed June 2, 1972.

As indicated schematically in FIG. 1, and as explained in greater detail in the referred to application, the temperature sensitive switch 10 can control setting of the ignition timing of the ignition system of the internal combustion engine in such a manner that, for example, during the warm-up period of the internal combustion engine, and also during the corresponding warmup period of the exhaust system of the engine, the ignition timing is additionally delayed beyond the normal ignition timing setting, depending on speed and load conditions of the engine. When the operating temperature of the catalytic reactor 19 has been reached, temperature sensitive switch 10 can then control the ignition timing to be in accordance with normal engine operation. For example, when the catalytic reactor 19 has reached its normal operating temperature, a controller to control the relative mixture of air and fuel of the air-fuel mixture being applied to the internal combustion engine can be activated, so that the air number λ will be controlled to a predetermined value (see the cross-referenced applications). It is usually not desirable to control the air number λ before the catalytic reactor 19 in the exhaust system of the internal combustion engine has reached its operating temperature.

The operating temperature of the catalytic reactor 19 in the exhaust system of the internal combustion engine may exceed normal operating temperatures, for example under very high loading of the internal combustion engine. If the normal operating temperature rises beyond a certain first level, one or both of the warning devices 11, 12 will be activated. This signal is a warning for the operator of the internal combustion engine, for example, for the driver of an automotive vehicle, that the catalytic reactor 19 is subject to damage due to overheating. Such warnings can be similar to the normal oil pressure warning lights, battery discharge warning lights and the like customary in automotive vehicles. As soon as lamp 11 lights, the operating conditions of the engine should therefore be changed to reduce the temperature in the exhaust system, so that the catalytic reactor will again drop to a normal operating temperature. Operation of the horn or audible signal 12 would then be grounds for taking immediate corrective action. As soon as the temperature level in reactor 19 has dropped, the warning devices 11, 12 will disconnect.

The warning devices 11, 12 are intended to warn the operator of the internal combustion engine. If these warning signals are ignored, further heating of the reactor would result in extreme damage, and possible destruction of the reactor 19. Upon further increase in temperature, that is, to a third threshold level, one, or two additional steps can be taken to reduce temperatures in the exhaust systems. For example, valve 13 can be controlled to throttle or completely shut off fuel to the internal combustion engine. This will cause rapid drop of heating in the exhaust system of the internal combustion engine, so that destruction of the reactor 19 is avoided. Cutting off fuel, however, may result in dangerous road conditions and this solution would be more suitable for application in a stationary internal combustion engine. For automotive vehicles, therefore, control of fuel by valve 13 may well be omitted. The reactor 19 is then protected from damage by operation of a flap valve 16 in such a direction that the exhaust gases from internal combustion engine 15 are diverted over bypass 20 to the tail pipe of the engine. Conducting the exhaust gases over the bypass 20 permits reactor 19 to be cooled without changing the operation of the engine, and thus without interfering with road performance of an automotive vehicle. The exhaust gases being emitted, however, will have a higher degree of noxious components such as CO hydrocarbons and $NO_x$, which are emitted into ambient air. Stoppages in the exhaust system and arising in the reactor, which would lead to rapid heating of the reactor if any gases are passed therethrough, are also remedied by operating flap valve 16 to lead the gases through bypass 20, until the stoppage in reactor 19 itself can be cleared.

FIG. 2 illustrates the electronic circuitry, in schematic form, of a multi-level temperature threshold switch. An operational amplifier 22 has a feed back resistor 23 connected between its output and the positive input thereof, which, in effect, causes the operational amplifier 22 to operate like a Schmitt-trigger. Application of an electrical signal to the negative terminal of operational amplifier 22 causes the operational amplifier to become energized when the threshold value thereof is exceeded, the output being applied over a resistor 24 to control a switching transistor 25 having a relay 26 in the emitter-collector circuit thereof to pull in the relay 26 and thus provide a signal to lamp 11, horn 12, or any other indicator or supervisory circuit. The negative input terminal of operational amplifier 22 is connected over resistor 27 to a junction 28. Resistors 29, 30 connect to the negative terminals of further operational amplifier 31, 32, connected similarly to operational amplifier 22, that is, provided with feedback resistors similar to the resistor 23 (not shown), so that they, also, will operate like Schmitt-triggers. The threshold of the operational amplifiers 31, 32 are set at different threshold levels, for example requiring a higher input signal. Thus, operational amplifier 31 can be set to control, for example, the horn and operational amplifier 32 to control, for example, fuel throttle valve 13, or exhaust bypass valve 16. Alternatively, only two higher temperature threshold can be set, for example by operational amplifiers 22, 31, and operational amplifier 32 can be set to control ignition retardation as schematically indicated at 42 (FIG. 1). Further operational amplifiers may be connected in parallel from junction 28, similar to operational amplifiers 22, 31, 32 to control other functions at different temperature threshold levels. The threshold level of the operational amplifiers can be determined by the voltage applied to the positive terminal of the operational amplifier, for example by setting of the voltage division ratio of series connected resistors 43, 44, connected across the source of power supplied for the system and providing a reference voltage to the positive terminal over coupling resistor 45.

The input to operational amplifiers 22, 31, 32, that is, junction 28 forms the output of an operational amplifier 33 having a feedback resistor 34 connected to its negative input terminal. This operational amplifier, therefore, operates as an amplifier. Input to the operational amplifier 33 is connected over a field effect transistor 35, operating as an impedance matching element, to which an output signal for temperature sensor 21 is applied at the terminal 21'. Temperature sensor 21 may be a temperature sensitive resistor, located, for example, in the cylinder head of the internal combustion engine. Placing a temperature sensitive resistor in the cylinder head of the internal combustion engine provides a signal which is representative of the temperature in the exhaust system of the internal combustion engine and, specifically, in any reactor, for example in a catalytic reactor connected therein. Temperature sensor 21 may also be a thermo element, such as a thermo couple located directly in heat transfer relation to the catalytic reactor in the exhaust system thereof. Thermo couples provide outputs corresponding to the temperature of the catalytic reactor 19 which can be used directly to control the temperature sensitive switch, provided an impedance matching element such as field effect transistor 35 is interposed between its output and the output to the operational amplifier 33.

The power supply to the temperature sensitive switch 10 itself is preferably provided over a voltage stabilization circuit 46 to increase the accuracy of response of the temperature sensitive switch 10, that is, to increase the accuracy of the temperature levels at which output signals are provided, and to suppress noise and voltage swings which are so prevalent in electric circuits connected to alternator-battery systems in automotive vehicles. The operation and the components of the stabilization circuit 46 are well known.

The temperature sensitive switch may be used not only to provide warning signals or signals to control a bypass valve to the reactor, or the fuel supply; the temperature-sensitive switch may have further functions, such as controlling feedback of exhaust gases to the inlet manifold of the engine.

The different threshold levels of the operational amplifiers 31, 32 are obtained by connecting the positive input thereof, through coupling resistors, to terminals 50', 50'' of voltage dividers, similar to voltage dividers 43, 44, with its tap terminal 50.

Various changes and modifications may be made within the scope of the inventive concept.

We claim:

1. Temperature monitoring and protective supervisory system for the exhaust system of internal combustion engine systems including at least one reactor (19) in the exhaust system thereof to prevent damage to the reactor due to excessive temperatures comprising
   a temperature sensing means (21) located in thermal sensing relationship to an element of the engine system and providing an electrical signal representative of temperature in the exhaust system of the engine and thus a measure of the operating condition of the reactor (19);
   a threshold switch means (10) having a plurality of switching positions, each having a corresponding output, and each corresponding to a discrete temperature level as sensed by the temperature sensing means (21), to provide a plurality of theshold signals, each corresponding to a discrete temperature threshold level in excess of a predetermined temperature arising within the exhaust system of the engine;
   and control means (11, 12, 13, 16) including an indicator means, and means connected to the engine system commanding operation of the engine system tending to reduce the operating temperatures arising within the exhaust system thereof, said control means being energized by said threshold switch means (10) when one of the threshold levels thereof is exceeded, the switch output of the respective threshold levels being connected to selectively activate said indicating means and said engine operating command means to permit corrective action to be taken before the reactor is being damaged.

2. System according to claim 1, wherein the temperature sensing means is located to be responsive to temperatures arising in the exhaust system of the engine.

3. System according to claim 1, wherein the temperature sensing means is responsive to temperatures arising within the reactor (19) in the exhaust system of the engine.

4. System according to claim 1, wherein the indicator means comprises at least one of optical and audible indicators (11, 12).

5. System according to claim 1, wherein the engine operating command means comprises a bypass (20) connected to shunt exhaust gases past the reactor (19), and means (16) controlling gas flow selectively through the bypass or over the reactor, said selectively controllable means being controlled by operation of the threshold switch (10).

6. System according to claim 5, wherein the selectively operable means comprises a diverter flap valve (16) selectively directing the exhaust gases through the reactor (19) or through the bypass (20).

7. System according to claim 1, wherein the engine operating command means comprises valve means (13) connected in the fuel supply line to the internal combustion engine and controlling fuel supply to the engine in dependence on the threshold level to which the switch (10) responds.

8. System according to claim 1, wherein the threshold switch means comprises a plurality of operational amplifiers (22, 31, 32), each connected as trigger circuits, and each having a separate threshold level corresponding to different temperature levels of the element in the exhaust system.

9. System according to claim 1, further comprising an additional operational amplifier (33) connected as an amplifier between said temperature sensing means (21) and said threshold switch means (22).

10. System according to claim 9, further comprising an impedance matching element (35) connected between said temperature sensing means (21) and said further operational amplifier (33).

11. System according to claim 1, wherein said threshold switch includes active electronic elements (22, 33); and voltage stabilization means (46) are interconnected between said active elements and the source of supply (+; −) and said active elements.

12. System according to claim 1, wherein said temperature sensing means is a temperature responsive resistor.

13. System according to claim 1, wherein the temperature sensing means comprises a thermo couple element.

14. System according to claim 1, wherein the reactor is a catalytic reactor and the temperature sensing means comprises a thermo couple located in heat transfer relation to the catalytic reactor.

* * * * *